United States Patent [19]

Laghi

[11] Patent Number: 4,474,724

[45] Date of Patent: Oct. 2, 1984

[54] LIQUID INJECTION MOLDING MACHINE FOR UTILIZING SILICONE COMPOSITIONS

[75] Inventor: Aldo A. Laghi, Ballston Lake, N.Y.

[73] Assignee: General Electric Company, Waterford, N.Y.

[21] Appl. No.: 500,220

[22] Filed: Jun. 2, 1983

Related U.S. Application Data

[60] Division of Ser. No. 421,690, Sep. 22, 1982, Pat. No. 4,402,661, which is a continuation of Ser. No. 183,620, Sep. 2, 1980, abandoned.

[51] Int. Cl.$^3$ .............................................. B28B 1/24
[52] U.S. Cl. .................................................. 264/328.2
[58] Field of Search .............................. 425/562, 543; 264/328.2

[56] References Cited

U.S. PATENT DOCUMENTS 3,436,446 4/1969 Angell .............................. 425/543 X Primary Examiner—Thomas P. Pavelko

[57] ABSTRACT

A plunger injection molding machine for utilizing a liquid composition and in addition to the other usual features, a valve for allowing liquid composition to enter a barrel means; sealing means on the plunger which operates on the barrel of the machine so as not to allow the liquid composition to leak pass the sealing means out of the rear of the barrel means; and stop means to regulate or control the rear work movement of the plunger means out of the barrel means which results in accurate control of the amount of liquid composition forced into the mold. A preferable composition for use with this type of machine is a silicone composition and more specifically a SiH olefin platinum catalyst silicone composition.

3 Claims, 6 Drawing Figures

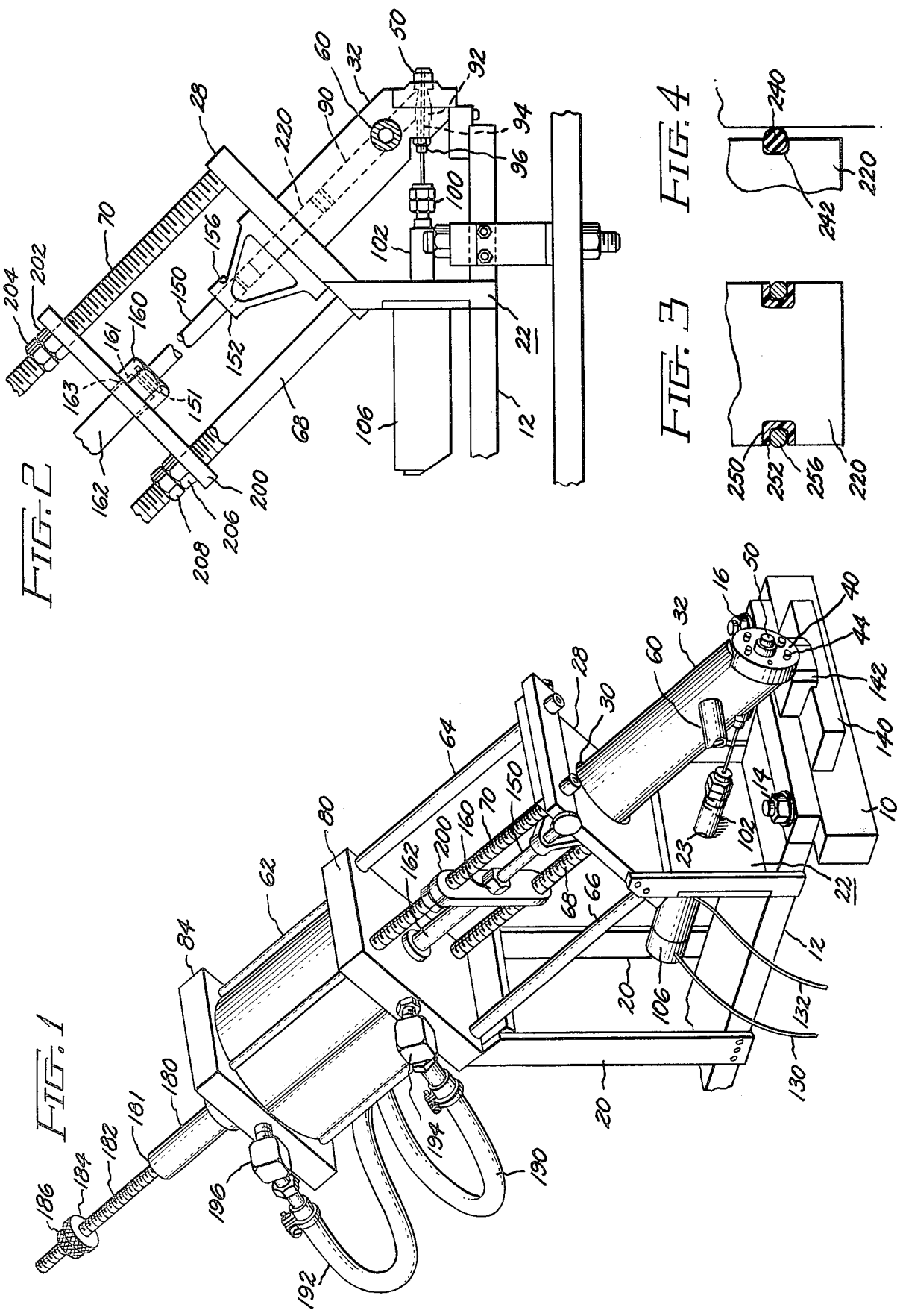

LIQUID INJECTION MOLDING MACHINE FOR UTILIZING SILICONE COMPOSITIONS

This application is a division of application Ser. No. 421,690, filed Sept. 22, 1982, now U.S. Pat No. 4,402,661, which is a continuation of application Ser. No. 183,620, filed Sept. 2, 1980, now abandoned.

BACKGROUND OF THE INVENTION

The present invention relates to liquid injection molding machines and more, particularly the present invention relates to a plunger type of liquid molding machines useful for injecting or utilizing liquid silicone composition.

Injection molding machines provide a unique advantage over other types of molding machines in preparing molded or encapsulated parts. Accordingly, molding is much simpler than with other type of systems. For instance, for molding of elastomers normally require several distinct operations, such as milling, sheeting or extruding, compression, transfer or injection molding followed by deflashing of the finished product. Traditionally there has been two types of injection molding machine. One is the repricating screw injection molding machine as disclosed on improvement thereover which is disclosed in the patent docket of Aldo Laghi Docket 60SI-308 filed June 13, 1980 entitled Apparatus For Liquid Injection Molded Parts. Prior to the modification of such machine pellets were inserted into a barrel where a screw picked up the pellets by force causing them to liquidify and force them in front of a ram in a barrel means. The ram would push at the appropriate time the liquified plastic out of a nozzle into a mold in front of the nozzle and the screw would retract from the mold leaving the molded part to be removed from the mold by known techniques. The improvement of A. Laghi in the copending docket was to include sealing means at the end of the screw means so that the liquified liquid molding composition would not leak out of the rear of the barrel means of the machine. Another modification was the utilization of a value to shut off the feed means into the barrel means of the liquid composition prior to the forcing of the liquid compositions into the mold by the screw means. The plastic pellets were feed into the barrel of the molding machine through a hopper and they were liquified by the forcing action of the screw forcing the material forward of the front end of the screw in the barrel means. Accordingly, when the screw moved forward it was just the pressure of the screw applied on the liquified organic cmposition to force it into the mold. However, at the same time the pressure that was utilized in the feed means to force the liquified composition into the barrel means was shut off and did not affect the liquid composition in the barrel means. Accordingly, the logic of the control valve of the copending Laghi docket was utilized to control the amount of liquified composition that would be introduced into the barrel means in front of the the ram of the screw in the barrel means and the valve would close and the only pressure affected upon the liquified composition barrel means would the pressure of the screw moving forward.

These modifications and improvement to the traditional reciprocating screw injection molding machines was made in the copending docket to allow the paresent machines to utilize liquid compositions and more specifically silicone liquid composition. It should be noted that the foregoing modifications of that patent application as well as the present application can be utilized with any liquid injection molding composition including a liquid silicone injection molding composition. The silicones have many advantages for injection molding compared to most organic elastomers. They cure more rapidly, they are easily pumpable, immiscible, provide easy release from the molded surface and in most cases do not required deflashing of the molding parts. Accordingly, the actual injection molding can be performed in cycle times which are much shorter than with other elastomers and the additional steps required for the molding of the traditional elastomers is substantially reduced. The milling of sheet or extruding operations are not required because of the liquid nature of the silicones which also permits accurate measurements and delivery to conventional pumping system. The deflasing operation is also eliminating due to the low cavity pressure and the cure characteristics of the material. As a result, considerable savings of labor overhead and material may be obtainable by switching from conventional molding processes to liquid injection molding. In fact, in some case when production volume is large and the size of the molding parts are small, liquid silicones can be more than cost competitive with even the cheapest organics. This is not surprising considering the cost of some of the steps of conventional molding processes such as molding and deflashing which depends most on the number of parts that are molded and not at the amount of material used. Liquid injection molding is characterized by a small capital investment because a small injection press can produce large number of parts per year in the low cavity pressure in fast cycle times. It should be noted that the properties of silicones add to the quality of the molded part which properties of silicones are in the part the superior or elastomeric properties of silicones at high and low temperatures and that they resist aging better than most other elastomers and plastics and they offer superior dielectric characteristics.

Various silicone compositions have been developed for the use of liquid injection molding machine. Basically such compositions comprise a vinyl containing polysiloxane, a hydride polysiloxane as opposed to a cross-linking agent and a platinum catalyst. Such compositions are traditionally referred to in silicone chemistry as SiH olefin platinum catalyzed compositions or addition cure composition or addition cure RTV compositions. Such compositions may contain various other ingredients such as for instance fillers, pigments and so forth. For example, fillers are fumed silica, precipitated silica, treated or untreated, and also extending fillers such as lithopone, zinc oxide, glass fibers, alpha quartz, and magnesium oxide and other type of fillers. Such compositions are sold in two forms for liquid injection molding compositions. In the one component form such compositions comprise the above ingredients with other additives as stated and in addition an inhibitor, where the inhibitor is preferably a hydroperoxy compound as disclosed in Bobear U.S. Pat. No. 4,061,609. These hydroperoxy inhibitors are very effective inhibitor which allows the composition to be mixed into a single component without curing for periods of time from six months to two years which at elevated temperatures cures rapidly in the matter of seconds. By elevated temperatures it is meant above 100° C. However such compositions are also made in two components. In such two component compositions the hydride polysiloxane is kept separate from the vinyl polysiloxane and the platinum catalyst is packaged in one or the other components. The materials is packaged in two components or two packages such that there is not a component or package in which there appears all three ingredients, that is the vinyl siloxane, the hydride cross-linking agent and the platinum catalyst. Such compositions which are into two components or two packages when the two packages are mixed will cure slowly at room temperature to a silicone elastomer and will cure rapidly at elevated temperatures to also a silicone elastomer. The shelf life of the composition when the two components are mixtued together can be extended, that is preventing the composition from curing when the two packages are mixed at room temperature can be extended for periods of days and even weeks by utilizing various types of inhibitors. Accordingly, there can be a long pot life or mixing time of the components and yet when the components are inserted to the molding and heated at elevated tempertures about 100° C. the composition will cure to a silicone elastomer in a matter of seconds. An example of two component compositions or inhibitors for two component compositions is, for instance, that disclosed in the patent application of Eckberg, Ser. No. 40,015. Another type of inhibitor is a low molecular weight silanol containing polysiloxane having from about 5 percent by weight of silanol. On an alkyl isocyanurate as disclosed in the patent application of Eckberg, Ser. No. 81,966. Depending on which inhibitor is used either a one component or two component composition silicone composition will result which can be utilized in a liquid injection molding machine of the types disclosed in the foregoing Laghi copending application and in the instant patent application. With respect to whether one component or two component silicone compositions are utilized, either one may be utilized with the advantages as pointed above that liquid composition have for an injection molding machine. Accordingly, it becomes desirable to utilize such compositions with a plunger type or ram type of a injection molding machine. Such ram type or plunger type of injection molding machine have traditionally been utilized with pellets. Accordingly, one of differences with a pellet machine is that the pellets are fed to the barrel through a hopper and then the plunger liquified the pellets by the pressure applied to the pellets and then forces them into a mold. Because of the variance in the voids between the pellets, this results in discrepancies in the shots fed into the mold. Accordingly, it was highly desirable to have a mechanism in the plunger injection molding machine essentially for controlling the size or maintaining the size of the shot of liquid composition at the same level for each molding operation. It is also desirable to have a mechanism in the plunger injection molding machine which would control or turn on and turn off the pressure from the feed means of the liquid composition into the injection molding machines from the pressure that is applied by the plunger. It was also desirable to have a means for sealing the plunger so as to prevent the liquid composition that was in front of the plunger from leaking past the plunger and out of the rear of the barrel means in a plunger injection molding machine.

Accordingly, these modifications are shown in the enclosed figures.

Accordingly, it is one object of the present invention to provide for a plunger injection molding machine suitable for molding liquid compositions that are fed into the machine.

It is an additional objection of the present invention to provide for a plunger injection molding machine which has a sealing means for effectively sealing the front end of the plunger means so as to prevent liquid composition for escaping from the rear barrel means in the injection molding machine.

It is an additional object of the present invention to provide a stop means for controlling and regulating the rearward motion of the plunger means from molding operation to molding operation.

It is yet an additional objection of the present invention to provide a means in a liquid plunger injection molding machine for maintaining a shot size inserted by the plunger into the mold the same for molding operation to molding operatopm of desired.

It is yet still another object of the present invention to provide for a valve on a feed means for feeding the liquid composition such that the valve means completely turns on and off the pressure and the flow of liquid composition from the feed means into the barrel means of a plunger type of injection molding machine.

These and other objects are accomplished by means of the disclosure set forth hereinbelow and as shown on the enclosed figures.

FIG. 1 is a prospective view of a vertical type of semi-automatic plunger injection molding machine showing the mechanism for preventing the rear ward motion of the plunger.

FIG. 2 is a view along lines 1—1 of FIG. 1 and is a cross-sectional view shown the stop means for prevent or controlling the rear ward motion of the plunger means and also the sealing means on the forward end of the plunger means.

FIG. 3 is a cross-sectional view of long lines of FIG. 2 showing the sealing means at the front end of the plunger means.

FIG. 4 shows an alternate embodiment and is a cross-sectional view of the front end of the plunger means of FIG. 2.

SUMMARY OF THE INVENTION

Figure 5:
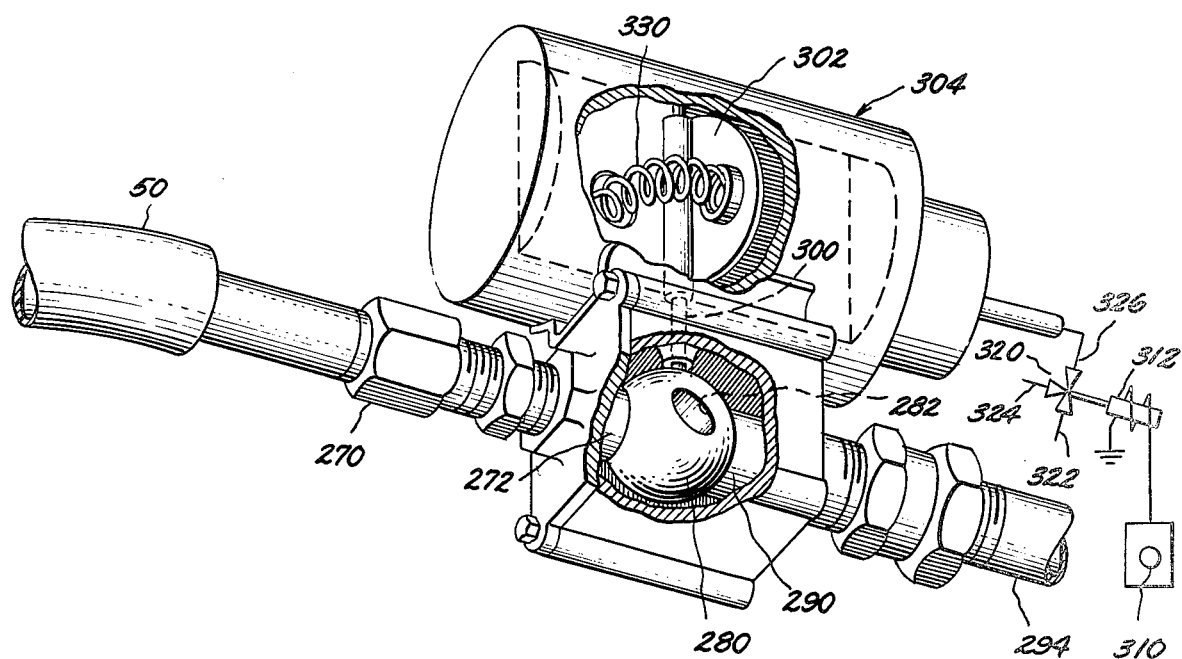
FIG. 5 is a perspective, partly cross-sectional view showing the valve and the air motor for turning on and off the value. To allow the feed composition into the plunger and into the barrel means of the plunger injection molding machine of FIG. 1.

In accordance with the above objects and as disclosed in the above figures there is provided by the present invention a plunger injection molding machine for utilizing silicone compositions comprising a frame, barrel means mounted on said frame, with a rear opening and a forward nozzle said forward nozzle located so as to force a liquid composition there through to under pressure, plunger means mounted on said frame such that said plunger means moves from the said rear opening in said barrel means and in said barrel means toward said nozzle and back in the direction of rear opening as liquid composition is alternately introduced and forced out of said nozzle, drive means mounted on said frame to the rear of said barrel means and mounted on said barrel means, driving said plunger means, shut off means mounted on said fame and adjacent to said forward nozzle in said barrel means adapted to close and open said nozzle.

feed means mounted on said forward end of mid barrel means in proximinty to said forward nozzle and adapted to feed liquid composition into said barrel means, and sealing means mounted on the forward end of said plunger means and preventing the liquid composition from going past said sealing means to the rear opening of said barrel means and thus leaking out.

Another modification is a valve means connected to said feed means adapted to allow liquid composition to pass through said feed means.

Another embodiment is valve means connected to said feeds means and adapted to allow liquid composition to pass through said feed means or to stop liquid composition from passing through said feed and second drive means adapted to open and close said valve means in synchronization with said first drive means such there is a first drive means which drives said plunger means forward in said barrel means as the second drive means closes said valve and where first drive means retracts the plunger means, said second drive means opens said valve. By said first drive means it is referred to the drive means or air motor that operates the plunger means.

Another embodiment is the utilization of stop means mounted on said frame and said plunger means adapted to control the rear work motion of said plunger and move said plunger means away from said forward nozzle in said barrel means. Other modifications will be discussed more fuller in detail below.

DESCRIPTION OF THE PREFERRED EMBODIMENT

Proceeding now to the figures. As is shown in the figures the modifications of the instant invention are applied to a vertical plunger liquid injection molding machine. It should be noted that the instant modifications can be also applied to a horizontal plunger or ram liquid injection molding machine. There is a support 10 which supports platform 12 through bolts and nuts 14 and 16 to which is appended rear support arms 20 and front support plate 22 to which is appended plate 28 having a circular opening therein 30. Through circular opening 30 there passes therethrough barrel means 32 to which is appended nozzle face plate 40 which is bolted on to barrel means 32 by bolts 44 wherein in turn there is screwed into nozzle face 40 nozzle 50. The liquid composition is squirted out of or injected out of nozzle 50 into the mold. The mold is not shown in the above drawings since it forms no part of the instant invention. Accordingly, a traditional mold and or any type of mold can be utilized with the invention of the instant case and the modifications of the instant case to vertical and horizontal plunger injection molding machines.

Figure 6:
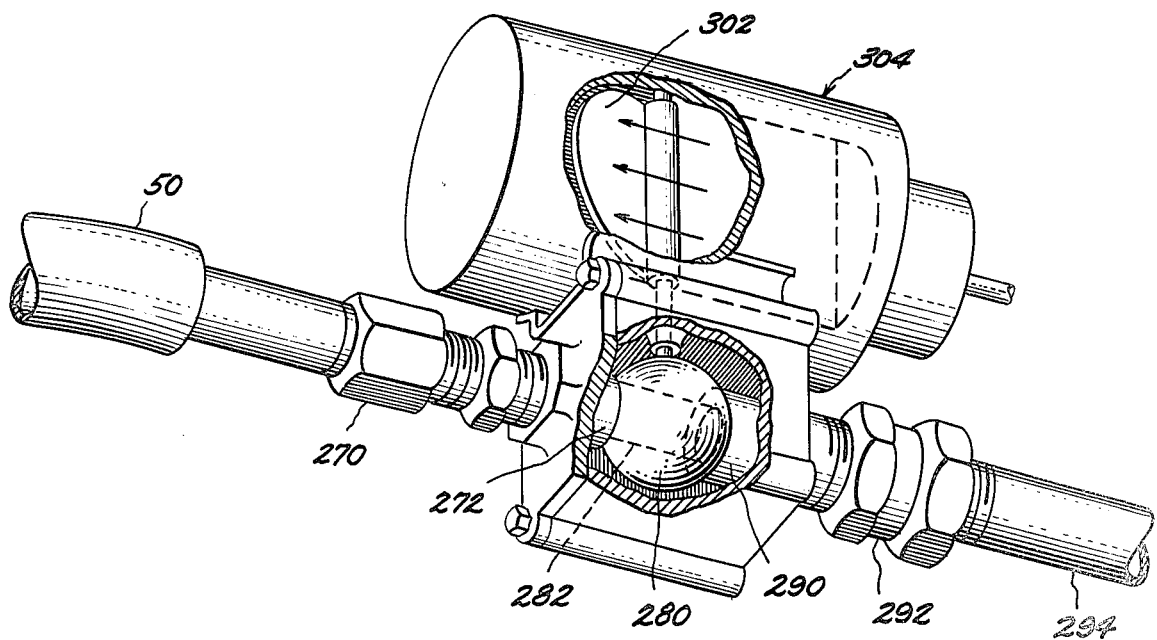
FIG. 6 is a view similar to FIG. 5 which shows the valve in an open position as distinguished from the closed position of the valve of FIG. 5.

The additional modifications of the instant invention in the barrel means 32 is that it has a feed line 60 to which is appended the valves shown in FIGS. 5 and 6. Face plate 28 is connected to air motor 62 through bars 64, 66, 68, and 70. Bars 64, 66, 68, and 70 support plate 80 which in turn supports the mechanism of air motor 62 to which is appended plate 84. Now proceeding to FIG. 2 which shows the barrell of 32 in more detail. Barrell means 32 comprises a cylinder having a longitudinal opering 90 throughout the extent of the cylinder and it also has horizontal cavity 92 into which passes pin 94 which has on it sealing nut 96 which is appended by coupling 100 to shaft 102 of air motor 106 which in turn is supported on platform 12 by plate 22. Plate 22 has opening 23 through which passes shaft 102. Pin 94 closes the opening in nozzle 50. Air cylinder 106 causes shaft 102 to move forward such that pin 94 closes nozzle 50 when the longitudinal cavity 90 in barrel means 32 is being filled with liquid composition and when longitudinal cavity 90 has been filled to the appropriate level then pin 94 retracts out of the opening in nozzle 50 so as to leave the opening open which retraction of pin 94 is carried out through shaft 102 as activated by air motor 106. Then material is forced out of the cavity 90 in a manner which will explained below through the opening of nozzle 50 into the mold after the injection forward thrust in liquid cavity 90 has been completed in barrel means 32 then air cylinder 106 activates shaft 102 so as to motivate pin 94 to close the opening of the nozzle 50 then more liquid composition is introduced into longitudinal cavity 90 in barrel means 32. Air motor 106 is operated through air introduced through lines 130 and 132 into air motor 106. It should be noted that support 10 has plates 140 and 142 for supporting the front portion of barrel means 32 nozzle plate 40 and nozzle 50.

Proceeding to FIG. 2 as well as FIG. 1 that passes in longitidinal cavity 90 plunger rod 150 through an opening 152 and saddle part 156 on the rear end of barrel means 32. Plunger shaft 150 is connected by coupling 160 to shaft 162. Shaft 162 is driven by air motor 62. It should be noted that shaft 162 passes through air motor 62 or has an extension which passes through an opening in plate 80, and through air motor 62. It also passes through an opening in plate 84 through tube 180 as threaded rod 182 having threaded disks 184 and 186 which plunger rod 150 moves integrally with plunger shaft 162 and threaded rod 182. Air lines 190, 192 through connectors 194 and 196 introduced air in air motor 62 and alternately take out air from air motor 62 as associated by the operation of air motor 62 so that plunger rod 150 either as associated by the operation of air motor 62 so that plunger rod 150 either passes further into longitudinal cavity 90 of barrel means 32 or retracts away from nozzle 50 to the rear portion of barrel means 32 as is required by the operation of the apparatus. It should be noted support rod 68 or 70 through opening in plate 200 and which are located at stop nuts 202, 204, 206 and 208. Stop nuts 202, 204 throughably engaged rod 70 while stop nuts 206 and 208 threadability engaged rod 68. Coupling 160 allows plate 200 to rest thereon and allows plate 200 to move downward as is necessitated. Accordingly coupling 160 is forced against the stop plate 200 having opening 163 thereon as to prevent plunger rod 150 or shaft from moving upwards past stop plate 200. Coupling nut 160 couples the flange end 151 plunger 150 threaded portion 161 of shaft 162 propelled by air motor 62. Stop plate 200 forms a basic part of the present invention. After cavity 90 of barrell means 32 has been filled with liquid composition, plunger rod 150 moves forward so as to force the liquid compsition in cavity 90 out through the opening of nozzle 50 into the mold. The forward motion of plunger rod 150 is limited by the abutment of threaded disc 184 and 186 on abutment tubing 180. The threaded disc 184 abuts the two upper surface 181 of tubing 180 and the forward travel of plunger rod is terminated. Accordingly, disc 184 and 186 can be utilized to set and control the forward travel of plunger rod 150 in cavity 90. There are two threaded discs 184 and 186 on threaded rod 182 since it is possible to more precisely set the travel of rod 182 into tubing 180 and thus the travel of plunger rod 150 into cavity 90 of barrel means 32. Plunger shaft 162 moves downward through opening 163 and stop plate 200. Stop plate 200 does not limit the forward travel of shaft 162 of plunger shaft 162 through opening 163 of plate 200. However, stop nuts 202, 204, 206 and 208 limit the rear ward motion of plate 200 and through coupling 100 the motion of shaft 162 and plunger rod 150. Accordingly, when plunger rod 150 retracts away from nozzle 50 so as allow composition to enter the forward end of longitudinal cavity 90 the rear ward motion of plunger rod 150 and plunger shaft 162 is stopped by the abutment of coupling nut 160 against the surface of stop plate 200. There are two plunger nuts on each threaded rods 68 and 70 since the two nuts allow the fine tuneing of the position of stop plate 200 and the rear work position to which stop plate 200 can go to.

It should be noted that some explanation is needed here of why the feed line 60 is at the forward end of barrel means 32. If the feed line 60 was at the rear portion of barrel means 32 than the plunger rod 50 would only push out of cavity 90 the amount of the liquid composition is necessary and sufficient to fill the mold, leaving, therefore, a cushion of material in front of the plunger at the end of the shot. This material being compressible would affect to some extent, the shot size accuracy. Most of all though, the problem with this type of design rests with the fact that the feed hole would be obstructed by the plunger 150 when this plunger begins the rear ward motion. At the end or the injection cycle, so as to allow the filling or the barrel for the next shot. If the feed hole is obstructed, then, two problems would develop; Material could not be fed to the barrel, and the plunger moving rear ward would create a vacuum in the barrell causing the introduction or some air from the nozzle, which air, during the next cycle would cause surface and/or structural defects in the molded parts.

Accordingly, it is highly desirable that the feed line of 60 be at the front end of barrel means 32 such that liquid composition is inserted into barrel means 32 before the head 220 of plunger rod such that always a liquid composition that is inserted the longitudinal cavity 90 of barrel means 32 is forced by the next operation of plunger rod 150 out of nozzle head 50 into the mold and remains forced out of longitudinal cavity 90 by the head 220 of plunger rod 150. If there is limited forward travel of plunger rod 150 with feel line 60 at the forward end of barrel means 32 material would remain in the barrel means in front of the plunger rod 150 and would seize after a time. Accordingly it is neccessary to limit the rearward motion of plunger rod 150. With respect to the stop plate 200 this allows a fixing to a very precise extent the rear work motion of plunger rod 150. Accordingly, the amount of liquid composition that is allowed to enter to longitudinal cavity from molding operation to molding operation can be fixed precisely which was not the case with prior art liquid injection molding machine.

It should be noted that the plate means 200 can be fixed in many different way so as to prevent rear ward motion of plunger rod 150. The above method of fixing or measuring the amount of rear ward motion or abutment stop action of face plate 200 against supporting rod 68 and 70 in the preferred one for this type of plunger injection molding machines and has been disclosed above.

In another embodiment of the instant invention, there is the placing of sealing means at the forward end of head 220 of plunger rod 150. The sealing means can be an intergal steal rod on the circumference of the plunger head which can be either integral with head 220 of plunger rod 150 but is more peferably a steel ring placed in a groove. A more preferable sealing means is a plastic gasket placed in a groove about the circumference of head 220 of plunger head of 150 such a gasket can be an O-ring. For instance it is preferred that such gaskets be made out of plastics which do not burn easily upon heating such as Teflon or more generally fluorinated hydrocarbon plastics. An example of such an O-ring in the groove in head 220 is an O-ring 240 in groove 242 of head 220 of plunger rod 150 as shown in FIG. 4. In another embodiment as shown in FIG. 3 a U-shaped cross-sectional gasket 252 is held in place in grove 250, by spring 256 about the circumferance of head 220 of plunger rod 150. Accordingly, there are many types of variations that can be made in the type of gasketing that can be applied on head 200 of plunger rod 150.

As mentioned the gasketing type of FIGS. 3 and 4 are preferred although there can be utilized steel rings as a type of gasketing which is not desirable because it is more expensive to obtain and is more expensive to replace. It should be noted that generally with the plunger at a diameter of ⅞ inch there would be utilized one gasket and there would be utilized more gaskets as the diameter of the plunger rod 150 increased. Accordingly, with a 2 inch diameter plunging rod there may be utilized as much as three gaskets in the head 220 of plunger rod 150.

Irrespective of which type of gasketing is used, it is desirable to have the gasketing at the forward head 220 of plunger rod 150 so as to prevent liquid composition in cavity 90 of barrel means 32 from leaking past the head 220 of plunger rod 150 and leaking out of the apparatus and more undesirably from curing at the rear portions of barrel means 32 so as to possibly cause a malfunction. It is possible that liquid composition leaking past head 220 of barrel rod 150 can cure in a rear portion of barrel means 32 which can cause a malfunction of the apparatus.

In a third embodiment of the instant invention which is desirably utilized as horizontal or vertical plunger injection molding machines is the valve means or line 60. A preferred embodiment of valve means is preferably that of FIGS. 5 and 6 on line 60. It is preferable that coupling 270 connect line 60 into tubing 272 where the passage of material through tubing 272 is monitered by ball 280 having longitudinal bore 282 therein. Ball 280 is adjacent to tubing 272 and flush with tubing 290 which is connected by coupling 292 to feed lne 294. Liquid composition passes from line 294 through coupling 292 where its travel forward is stopped from passing through tubing 272 and coupling 270 in line 60 by ball valve 280, to be closed. Ball value 280 is closed when bore 282 is transversed to tubinh 272 and tubing 290 as shown in FIG. 5. The movement of ball 280 is controlled by shaft 300 which is connected to it and which in turn moves integrally with disk 302. Disk 302 is motivated by air motor 304 so as to move rod 300 which is turn moves ball 280 so as to open or close the valve the that valve being open when bore 282 is aligned with the openings of tubings of 272 and 290 and the ball valve being closed when bore 282 is transverse to the openings in the tubing 272 and 290.

The foregoing machine as shown in FIGS. 5 and 6 in a semi-automatic machine. Accordingly, the operation of the machine comprises pushing a button or contact 310 which energizes the solenoid 312 which moves 3-way valve 320 such that the air passes from lines 322 and 324. Accordingly, air does not pass through line 326 and as such the air motor 304 is not energized and accordingly, a spring 330 holds disk 302 and rod 300 such that the ball 280 is closed to the passage of liquid composition in line 60 from line 294. Then when the ball valve is closed the composition does not flow through line 60 into longitudinal cavity in barrel means 32. Accordingly, the pressure in lines 294 is shot off from the pressure in line 60.

At that point, through logic control plunger rod 150 is energized to come forward in longitudinal cavity 90 of barrel means 32 and forced liquid composition out of nozzle 50 into the mold when the buttom is pressed another action occurs by logic control and that is pin 94 retracts out of the opening out of nozzle head 50 si as to leave the opening in nozzle 50 open for the forcing of liquid composition by plunger rod 150 and plunger head 220 out of the longitudinal cavity 90 in barrel means 32 into the mold. By logic control after the plunger head 220 is in its forward most possible as determined by the abutment of disc 184 on surface 181 of abutment tubing 180 then pin 94 moves forward to close the opening in nozzle 50 activated then in three way valve 320 line 324 is moved out of alignment with line 322 and lines 326 is moved in line with 322 such as air passes into the right of motor 304 as shown in FIG. 6. Disc 302 is moved as shown by the arrows in that ball 280 is moved so that bore 282 in ball 280 is aligned with tubing 272 and tubing 290 such that the liquid composition can be forced into feed line 60 into longitudinal cavity 90 of barrel means 32 as plunger rods 50 and the head 220 of plunger rod 150 retracts out of cavity 90 of barrel means 32 until stop plate 200 abuts nuts 202, 204, 206, and 208 which limits the rear ward travel of rod 150.

Accordingly, there are three modifications and embodiments which have been shown in the instant invention which can be applied on any vertical or horizontal plunger injection molding machine for liquid composition. One of which in the valve showing in FIGS. 5 and 6 for controlling the flow of the liquid composition onto the apparatus. Accordingly, a valve as disclosed in FIGS. 5 and 6 will allow liquid composition to flow into the longitudinal cavity in barrel means 32 which can turn off and turn on the pressure form feed line 294 from the pressure in longitudinal cavity in barrel means 32.

Another embodiment is sealing means in plunger head 220 of plunger rod 150 as shown in FIGS. 3 and 4. Still another embodiment is the stop plate means of FIGS. 1 and 2 as shown by the particular embodiment of stop plate 200 for eliminating the rearward travel of plunger rod 150 and plunger head 220 in longitudinal cavity 90 of barrel means 32.

The invention has been disclosed as applied to a semi-automatic machine however, thru modifications that have been disclosed above of the instant invention can be applied to fully automatic machines as well. Further, the particular valve is a preferred embodiment within the scope of the instant invention ther valves can be utilized to turn on and turn off the liquid feed in lind 294 from the composition in longitudinal cavity 90 of barrel means 32 and can be utilized to turn on and off the pressure of line 294 from the liquid pressure in longitudinal cavity 90. It should be noted that the invention of the instant case lies in the valve means and any type of suitable valve means can be utilized. A specific type has been shown so as to illustrate the present invention but it is not intended to be limited to that valve means. It is not intended to limit the invention to the particular type of valve means shown in FIGS. 5 and 6. Accordingly, in addition a particular type of sealing means has been shown on the head 220 of plunger rod 150; however, it is not intended to limit the invention to the sealing means of FIGS. 3 and 4. It should be noted that any suitable sealing means within the scope of a worker skilled in the art can be utilized in the plunger apparatus. Further, there can be utilized any suitable stop plate means for limiting the rearward motion of plunger rod 150. The foregoing stop plate means that has been disclosed or bore is the most preferred. Finally, the foregoing modifications of the instant invention can be utilized with any plunger type of injection molding machine vertical or horizontal in which a liquid molding composition is to be utilized. Preferably the machine is utilized with silicone liquid molding compositions and most specifically with SiH olefin platinum catalyst compositions. Any type of silicone composition can be utilized with a foregoing modifications or improvements in a plunger type of injection molding machine. It should be noted that the silicone compositions disclosed in the background of the invention are just some of the compositions that may be utilized with the improved type of plunger injection molding machines of the instant case and that other types that have been developed and will be developed in the future can also be utilized with such a liquid injection molding machine. It should also be noted that liquid compositions other than silicone compositions may be utilized with in the proved plunger type of injection molding machinges of the instant case.

I claim:

1. In a method for forming silicone rubber molded parts utilizing a plunger injection molding maching comprising the steps:

(a) feeding molding composition into a barrel means through a feed means mounted on the forward end of said barrel means in close proximity to a forward nozzle, (b) retracting a shut-off means mounted to the machine frame adjacent to said forward nozzle in said barrel means so as to open said nozzle, (c) actuating a first drive means mounted on said machine frame to the rear of said barrel means and connected to said barrel means, (d) forcing molding composition out of said nozzle into a mold as a result of said first drive means driving a plunger means towards said nozzle, (e) causing said shut-off means to close said nozzle, (f) curing said molding composition, (g) the improvement which comprises regulating the size of the shot of liquid composition by providing a valve means connected to said feed means said valve means being adapted to allow molding composition to pass through said feed means or to stop said molding composition from passing through said feed means, and a second drive means adapted to open and close said valve means in synchronization with said first drive means such that when said first drive means drives said plunger means forward in said barrel means said second drive means closes said valve, and when said first drive means retracts said plunger means, said second drive means opens said valve.

2. The method of claim 1 further comprising the improvement of providing a sealing means mounted on the forward end of said plunger means so as to prevent molding composition from going past said sealing means to an opening at the rear of said barrel means.

3. The method of claim 1 further comprising the improvement of providing a stop means mounted on said plunger means and adapted to control the rearward motion of said plunger means away from said nozzle in said barrel means.

* * * * *